United States Patent [19]

Barrable

[11] 4,101,335

[45] Jul. 18, 1978

[54] BUILDING BOARD

[75] Inventor: Victor Ernest Barrable, Gerrards Cross, England

[73] Assignee: Cape Boards & Panels Ltd., Uxbridge, England

[21] Appl. No.: 790,676

[22] Filed: Apr. 25, 1977

Related U.S. Application Data

[63] Continuation-in-part of Ser. No. 738,688, Nov. 4, 1976, which is a continuation of Ser. No. 538,197, Jan. 2, 1976, abandoned.

[51] Int. Cl.² ............................................. C04B 7/02
[52] U.S. Cl. ........................................ 106/99; 106/119; 106/120; 106/DIG. 3
[58] Field of Search ................... 106/90, 99, 119, 120, 106/DIG. 1

[56] References Cited

U.S. PATENT DOCUMENTS

| | | | |
|---|---|---|---|
| 3,501,323 | 3/1970 | Moorehead | 106/99 |
| 3,645,961 | 2/1972 | Goldfein | 106/99 |
| 3,716,386 | 2/1973 | Kempster | 106/90 |
| 3,758,319 | 9/1973 | Ergene | 106/90 |
| 3,827,895 | 8/1974 | Copeland | 106/99 |
| 3,841,885 | 10/1974 | Jakel | 106/99 |
| 3,847,633 | 11/1974 | Race | 106/99 |
| 3,901,991 | 8/1975 | Ueda et al. | 106/120 |
| 3,926,653 | 12/1975 | Shannon et al. | 106/120 |
| 3,965,020 | 6/1976 | Noll et al. | 106/120 |

*Primary Examiner*—J. Poer
*Attorney, Agent, or Firm*—Diller, Brown, Ramik & Wight

[57] ABSTRACT

An asbestos-free composition suitable for the manufacture of shaped articles comprising (a) a water-settable inorganic binder which is one or more of a calcium silicate binder (or compounds necessary for the formation thereof), Portland cement, aluminous cement and blast furnace slag cement, (b) organic reinforcing fibres and (c) mica and/or vermiculite. The composition may be shaped on conventional shaping, e.g. boardmaking, machinery and the products have superior fire and shrinkage resistance.

38 Claims, No Drawings

BUILDING BOARD

RELATED APPLICATIONS

This application is a continuation-in-part application of my application No. 738,688, filed November 4th. 1976, which is itself a continuation application of my application No. 538,197, filed January, 2nd. 1976, now abandoned.

BACKGROUND OF THE INVENTION

This invention relates to moulding compositions for the manufacture of shaped articles, and is primarily concerned with providing a novel composition from which fire-resistant shaped articles may be made. The invention also relates to a method for making the shaped articles and to the shaped articles themselves.

The shaped articles with which I am especially concerned in this invention are those whose application requires them to exhibit a degree of fire-resistance and high temperatureresistance. Thus I am particularly concerned with the manufacture of building boards, for use both in the building and shipbuilding industries, where good fire-resistance is important; I am also concerned with products whose use exposes them to high temperatures, and in this category may be mentioned components of ovens, e.g. walls and door linings, and metal, e.g. aluminium, casting equipment.

It is well known to make building boards, and other shaped articles useful in the building, shipbuilding and metal casting industries, from compositions containing binders and reinforcing fillers. Suitable binders for this purpose include Portland cement and the family of binders known as the "calcium silicates", which latter are made by the reaction, under autoclaving conditions, of a calcareous component (which might be Portland cement) and a siliceous component. Typical fillers for such compositions are asbestos fibres, which are most useful in providing the ultimate products with strength, heat resistance and fire resistance, and asbestos-cement and asbestos-calcium silicate products have found much favour throughout the world for a wide variety of applications.

However, the use at the present time of asbestos is thought to create a health hazard, and there is thus urgently sought non-asbestos products which possess all the advantages of asbestos-reinforced products but at the same time do not involve their disadvantages. It is thus an object of the present invention to provide an asbestos-free composition from which boards and other shaped articles may be manufactured.

SUMMARY OF THE INVENTION

The present invention is based on the discovery that asbestos reinforcing fibres in moulding compositions may be replaced, so far as their reinforcing properties are concerned, with organic, e.g. cellulose, fibres and, so far as their fire-resistance properties are concerned, with mica and/or vermiculite.

According to the present invention, therefore, an asbestosfree composition suitable for the manufacture therefrom of shaped articles comprises (a) a water-settable inorganic binder which is one or more of a calcium silicate binder (or compounds necessary for the formation thereof), Portland cement, aluminous cement and blast furnace slag cement, (b) fibrous reinforcing material including organic fibres which do not melt below 140° C, and (c) mica and/or vermiculite.

The term "water-settable inorganic binder" used herein means a binder which is caused to set by the action thereon of $H_2O$ in any of its forms, i.e. water, atmospheric moisture, steam.

The composition of the invention may be used in the manufacture of all kinds of shaped articles, such as slabs, blocks pipe sections and the like. It is especially suitable for manufacturing building boards and thermal insulation products, and will be described in relation thereto hereinafter. It should be noted that when we refer herein to "building boards" we mean this term in its widest sense, i.e. as denoting boards for use in any building construction. Thus, the term embraces, for example, boards for use in ships, known as marine boards. The invention is also useful for the production of high temperatureresisting shaped products, for example oven components, metal casting equipment and the like. For convenience, however, I shall limit the specific discussion herein to boards.

The organic fibres used as reinforcing material in the compositions of the invention are preferably cellulosic fibres, suitably those produced from wood pulps for papermaking processes, i.e. sulphate, sulphite and mechanical pulps, waste wood pulps of all types, newsprint, jute, flax, cotton, straw, esparto grass, hemp, kenaff, manilla, abaca, rannie and bagasses.

Other suitable organic fibrous reinforcing materials, include polyamide fibres, for example Nylon, polyester fibres, for example polyethylene terephthalate ("Terylene"), polypropylene fibres, carbon fibres and viscose fibres.

The reinforcing fibres may be exclusively organic in nature, or the reinforcement may contain additional, i.e. inorganic fibrous reinforcing materials. Typical inorganic fibres are glass fibres (this includes alkali-resistant glass fibres), slag wool fibres, mineral or rock wool fibres, ceramic fibres such as zirconium oxide fibres and alumina fibres, silica-alumina fibres, aluminium silicate fibres and metal fibres, any of which may be incorporated into the compositions in addition to the organic fibres. Depending on the additional reinforcing materials, and also on the purpose for which the shaped articles to be made from the composition are to be used, the reinforcing material may contain anything from 5% by weight to 100% by weight of organic fibrous material. The organic fibres, preferably cellulose fibres, are preferably present in the compositions of the invention in amounts of 2 to 15% by weight of the solids content of the composition.

Although the organic fibres are used primarily for reinforcement purposes, they do add an element of fire-resistance to articles made from compositions according to the invention (particularly in the preferred proportions mentioned above), as does the addition of the inorganic fibrous reinforcing materials used in conjunction therewith. Any or all of the inorganic fibres may be coated with, for example, alkali-resistant materials. When these additional inorganic fibrous reinforcing materials are used they are preferably used in amounts from 95-0.5% suitably 40-10%, by weight based on the total weight of fibrous reinforcing material.

The inorganic binder is a water settable calcium silicate binder, Portland cement, aluminous cement or blast furnace slag cement, or a mixture of any two or more of these. By calcium silicate we mean any of the family of autoclaved or non-autoclaved binders made from a combination of siliceous component (i.e. a material containing reactive silica, e.g. PFA, quartz, sand, clay, diatomite) and calcareous component (i.e. any mineral, raw material or waste product containing more than 30% of CaO, e.g. lime). Calcium silicate binders are preferred in accordance with the invention, and it will be appreciated that when we refer to a "calcium silicate" binder being present in the moulding compositions of the invention it is of course the precursors of the binder that will be present. Portland cement is also a most suitable binder, either alone or in a mixture with the calcium silicate binder.

Preferably the binder forms between 50 and 99% by weight of the total weight of binder and reinforcing fibre, the fibre being present in an amount of 1 to 50% on the same basis. Preferably the binder comprises 70-90% by weight of the binder/fibre total weight.

The third ingredient of the composition of the invention, mica and/or vermiculite, may be present in the composition in amounts up to 60% by weight, based on the total solids content of the composition. The mica may be muscovite, biotite or phlogopite (e.g. Suzorite - Trade Mark). Especially suitable grades of mica and vermiculite, which confer on the products of the invention fire-resistance properties similar to those attributable to asbestos in products made hitherto are those having an average particle size (flake diameter in the case of mica) of less than 2mm. Preferably the particle size of the mica and/or vermiculite is such that at least 95% is of a particle size less than 0.6mm. A particularly important result of the incorporation of vermiculite and/or mica in the compositions of the invention is the improved shrinkage properties of the final moulded products, e.g. thermal insulation or building boards. Low shrinkage at high tempertures is a characteristic which will make boards made from the present compositions particularly attractive for those sections of the building industry where fire resistance is a requirement. This property also makes products made from the present compositions attractive for use in the metal casting and smelting industries, e.g. for making and lining receptacles and launders. The shaped products of the invention shrink very little on contact with hot metal, e.g. molten aluminium, and the normal preshrinking of fibre/cement shaped articles hitherto used in such areas is not necessary with the instant products.

Other fillers which may be present in the composition include granular, cellular and fibrous fillers such as perlite, kieselguhr, diatomite, clays and clay wastes, carbonates such as chalk, dolomites and magnesium carbonate, calcium sulphate, wollastonite and other natural or synthetically produced calcium silicate fillers. These may be present in amounts up to 50% by weight of the total solids. It should also be remarked that the perlite, kieselguhr, clay and clay wastes, if they contain reactive silica, may also constitute a component of the binder.

When making boards from compositions according to the invention it is normal practice first to form an aqueous slurry of the composition. This aqueous slurry will normally have a solids content of 3 to 20% or higher, e.g. 35% by weight. The slurry may be heated slightly, e.g. to 25° to 45° C, and may contain small amounts of such additional ingredients as flocculants to control raw material retention and as filtration aids (such as polyacrylamide), water retention aids, hydromodifiers (e.g. carboxymethyl cellulose derivatives, polyethylene oxides), wetting agents (e.g. detergents), and setting controlling agents (e.g. calcium chloride and ligno sulphonates).

The slurry may then be formed into boards by any of the known processes for making building boards from fibre-reinforced cements. These include (a) the Hatschek process, (b) the Magnani process, (c) the use of a simple press and (d) The Fourdriner process, all of which processes dewater the boards to an extent which makes them easily handleable. Other known processes include the injection extrusion and spray-suction processes. After the boards have been formed by any of these basically known techniques, the binder or cement is allowed to set off. This may be done by autoclaving, for example when the binder is a "calcium silicate" binder (for example at pressures up to 220 p.s.i., and suitably at pressures up to 150 p.s.i., for periods ranging from 2 to 24 hours), or, if the binder is an inorganic cement, by air curing or by steam heating in an oven at 80° to 90° C and then maturing at room temperature or in heated rooms in the presence of humidity until products are obtained having the desired properties. The boards may then be immediately dried if desired.

The initial slurry for use in processes (a) to (d) above will normally be made up by hydrapulping and dispersing the fibrous materials which go into the composition in water, followed by the addition of the other, powdered materials to form a slurry of approximately water: solids ratio of 5:1 to 10:1. The slurry is then further diluted with water to give a water: solids ratio of approximately 25:1. Boards are then made from the latter slurry by dewatering on the relevant machine to give a water:solids ratio of approximately 1:1. Other methods of fluidising the composition than those mentioned above may be employed, particularly when injection-, extrusion- or spray suction-forming. Thus, when the "vibro-fluidising" technique is used, which involves the incorporation in the mixture of superplasticisers, no de-watering is necessary. "Vibro-fluidisation" is fluidisation by means of high frequency mechanical vibration.

When shaped articles other than building boards are to be manufactured the composition is compounded so as to have a viscosity appropriate to the particular manufacture involved. Thus, for making pipe sections the composition would be substantially more viscous than for making boards. The spray-suction technique may be used for this, which involves spraying the reinforcing fibres through one spray nozzle into a mix formed by the other ingredients, which are sprayed through a second spray nozzle, which mix may or may not be dewatered, as desired.

In certain cases it may be of advantage to form the inorganic binder just prior to mixing with the fibre, particularly when it is of the calcium silicate type. Thus for example, lime (the calcareous component) and quartz (the siliceous component) may be pre-reacted in a stirred autoclave to produce the calcium silicate binder. The organic fibrous material, the vermiculite and/or mica, and any other filler material are then stirred into the aqueous system of binder, which is then formed into the required shape, further autoclaved if desired, dewatered and dried. The procedure is particularly advantageous when inorganic fibres, e.g. E glass or mineral fibre, are included in the mix as alkali degradation is minimised and furthermore when a calcium silicate binder is used it allows low density products to be produced.

In a further embodiment a slurry of calcium silicate-forming ingredients, reinforcing organic fibre, vermiculite and/or mica, and water is prepared, and to this slurry is added freshly prepared tobermorite or xonotlite. The mixture is then shaped, dewatered, autoclaved and dried as before.

The following Examples are given for the purpose of illustrating the invention. All parts are parts by weight. In certain of the Examples reference is made to an MFT (micro fire test) crack value. This value represents the time, expressed in minutes, before a 4 inch diameter laboratory sample of the product in question, heated at the same rate as is described in British Standards Specification No. 476; part 8, starts to crack.

EXAMPLE 1

12 Parts cellulose fibres are dispersed in water and hydrapulped, and 31.8 parts lime, 29.2 parts quartz, 12 parts mica and 15 parts Portland cement are added to form a slurry of approximately 10:1 water:solids ratio. The slurry was thoroughly mixed and further diluted with water to give a water:solids ratio of approximately 25:1. The slurry was formed into boards by dewatering on a Hatschek or Magnani machine, to give a water:solids ratio of approximately 1:1. The formed boards were autoclaved at 135 p.s.i. for 24 hours, and the resulting boards had a density of 750 kg/m$^3$, a modulus of rupture of 13.5 N/mm$^2$ and an MFT crack (micro fire test) of 40 minutes.

EXAMPLE 2

A mixture of 6 parts cellulose fibres and 6 parts "Cemfil" (RTM) alkali-resistant glass fibres was dispersed in water, followed by the addition of 37.7 parts lime, 15.8 parts quartz, 21.5 parts diatomite and 13.0 parts vermiculite to give a slurry of water:solids ratio approximately 10:1. The slurry was thoroughly mixed and further diluted with water to give a water:solids ratio of approximately 25:1. The slurry was formed into boards by dewatering on a Hatschek machine, to give a water:solids ratio of approximately 1:1. The formed boards were autoclaved at 150 p.s.i. for 18 hours, and the resulting boards had a density of 710 kg/m$^3$ and a modulus of rupture of 8.6 N/mm$^2$. Similar results were obtained when the boards were made on a Magnani machine and on a press.

EXAMPLE 3

Using a similar technique to that described above, building boards were produced, on a press, from an aqueous slurry containing 10 parts cellulose fibres, 50 parts vermiculite, 21 parts lime and 19 parts quartz. The boards were autoclaved at 150 p.s.i. for 36 hours, and had a density of 600 kg/m$^3$ and a modulus of rupture of 6.5 N/mm$^2$.

EXAMPLES 4 and 5

Building boards were manufactured from the ingredients, and had the properties, specified below. In each case the cellulose fibres were dispersed in water and hydrapulped, the remaining ingredients were added and the resulting slurry thoroughly mixed and diluted. It was formed into boards using both the Hatschek and Magnani methods and the boards were autoclaved.

|  | Example 4. | Example 5. |
| --- | --- | --- |
| Cellulose (parts) | 12.0 | 10.0 |
| Lime (parts) | 31.8 | 42.0 |
| Quartz (parts) | 29.2 | 21.0 |
| Vermiculite (parts) | 12.0 | 12.0 |
| Cement (parts) | 15.0 | 15.0 |
| Autoclaving conditions | 135 psi/24hrs. | 135 psi/24Hrs. |
| Density (kg/m$^3$) | 725 | 715 |
| Modulus of rupture (N/mm$^2$) | 12 | 5.5 |
| MFT crack (minutes) | 15 | 20 |

EXAMPLES 6 to 8

Boards were made by forming into shape a slurry of the inorganic ingredients and fibres, then dewatering, autoclaving and drying. Autoclaving was at 135 psi for 24 hours.

|  | Example 6. | | Example 7. | | Example 8. | |
| --- | --- | --- | --- | --- | --- | --- |
| Cellulose | 12.5 | parts | 12.5 | parts | 12.5 | parts |
| Lime | 46 | " | 35 | " | 25 | " |
| Silica | 41.5 | " | 32.5 | " | 22.5 | " |
| Vermiculite, 95% less than 0.6mm | 0. | | 20 | " | 40 | " |
| Modulus of rupture (N/mm$^2$) | 16 | | 10 | | 6 | |
| Density (kg/m$^3$) | 900 | | 700 | | 620 | |
| Dilatometer Shrinkage (linear) at 900° C % | 6.5 | | 2.25 | | 0.75 | |

EXAMPLES 9 to 11

Boards were made as in Example 6, but autoclaving was at 100 psi for 30 hours.

|  | Example 9. | | Example 10. | | Example 11. | |
| --- | --- | --- | --- | --- | --- | --- |
| Cellulose | 10 | parts | 10 | parts | 10 | parts |
| Cemfil Alkali resistant glass fibre | 2.5 | " | 2.5 | " | 2.5 | " |
| Lime | 46 | parts | 35 | parts | 25 | parts |
| Silica | 41.5 | " | 32.5 | " | 22.5 | " |
| Muscovite mica, 95% less than 0.4mm | 0 | | 20 | | 40 | |
| Modulus of rupture (N/mm$^2$) | 16 | | 12 | | 10 | |
| Density (kg/m$^3$) | 900 | | 850 | | 800 | |
| Dilatometer shrinkage (linear at 900° C) % | 6.0 | | 1.9 | | 0.5 | |

EXAMPLE 12

Boards were made as in Example 6, from the following mixes:

| Cellulose | 7.5 parts |

-continued

| | | |
|---|---|---|
| Lime | 37.5 | " |
| Silica | 35.0 | " |
| Muscovite mica (various grades) | 20 | " |

| | Particle size of the mica | Dilatometer Shrinkage of boards (linear at 900° C) % |
|---|---|---|
| 95% less than | 0.6 mm | 1.75 |
| 95% less than | 0.4 mm | 1.90 |
| 95% less than | 0.15mm | 2.30 |
| 95% less than | 0.12mm | 2.70 |

EXAMPLE 13

Boards were made as in Example 6, but autoclaving was at 70 psi for 36 hours, from the following mix:

| | | |
|---|---|---|
| Cellulose | 3 | parts |
| "Cemfil" alkali resistant glass fibre | 3 | parts |
| Lime | 32 | parts |
| Silica | 32 | parts |
| Mica (95% less than 1.5mm) | 15 | parts |
| Vermiculite (95% less than 1.5mm) | 15 | parts |
| Modulus of rupture (N/mm$^2$) | 8 | |
| Density (kg/m$^3$) | 800 | |
| Dilatometer shrinkage (linear at 900° C) % | 1.5 | |

A similar product could be produced by utilising 10 parts "Rocksil" mineral fibre in place of the glass fibre and by suitable adjustment of the lime silica content to give a total 100 parts.

EXAMPLE 14

Example 10 was repeated, with the muscovite mica being replaced with 20 parts ground phlogopite. The resulting board had a shrinkage of 2%.

EXAMPLE 15

Example 10 was repeated, with the muscovite mica being replaced with 20 parts ground biotite. The resulting board had a shrinkage of 3.5%.

EXAMPLE 16 to 18

Boards were made by forming into shape a slurry of the following ingredients, then dewatering and air curing for 28 days.

| | Example 16. | | Example 17. | | Example 18. | |
|---|---|---|---|---|---|---|
| Cellulose | 12.5 | parts | 12.5 | parts | 12.5 | parts |
| Portland cement | 87.5 | " | 67.5 | " | 47.5 | " |
| Vermiculite (95% <0.6mm) | 0 | | 20 | " | 40 | " |
| Modulus of rupture (N/mm$^2$) | 14 | | 10 | | 5.5 | |
| Density (kg/m$^3$) | 945 | | 790 | | 700 | |
| Dilatometer shrinkage at 900° C (%) | 6.5 | | 2.65 | | 2.0 | |

EXAMPLES 19 to 20

Boards were made as described in Example 6, with the exception of the autoclaving conditions, detailed below from compositions containing the following ingredients:

| | Example 19 | | Example 20 | |
|---|---|---|---|---|
| Vermiculite (95% less than 0.6mm) | 25 | parts | 15 | parts |
| Mica | | | 10 | parts |
| "E" glass (alkali resistant fibre) | 7 | parts | | |
| Cellulose fibres | 2.5 | parts | 3.0 | parts |
| Diatomite | 20 | parts | | |
| Silica | 10 | parts | | |
| Lime | 35.5 | parts | 36 | parts |
| Autoclaving conditions | 24 hrs/100 p.s.i. | | 7 hrs/180 p.s.i. | |
| Density (kg/m$^3$) | 620 | | 815 | |
| Modulus of rupture (N/mm$^2$) | 4.5 | | 7.5 | |

EXAMPLE 21

A board was made from a composition similar to that of Example 19 but wherein all the "E" glass was replaced with mica.

EXAMPLES 22 to 24

Boards were made as described in Example 6 from the following ingredients and had the following shrinkage properties:

| | Example 22 | | Example 23 | | Example 24 | |
|---|---|---|---|---|---|---|
| Cellulose | 12.5 | parts | 12.5 | parts | 12.5 | parts |
| Lime | 46 | parts | 35 | parts | 35 | parts |
| Silica | 41.5 | parts | 32.5 | parts | 32.5 | parts |
| Vermiculite | 0 | | 20 | parts (95%<0.6mm) | 20 | parts (95%<1.5mm) |
| Dilatometer Shrinkage (linear) at 900° C (%) | 6.5 | | 2.25 | | 1.90 | |

EXAMPLE 25

A hydrated calcium silicate of the tobermorite type was produced in a stirred autoclave from ground quartz and hydrated lime in a mol ratio CaO:SiO$_2$ of 0.9:1.0, using a steam pressure of 120 p.s.i. gauge.

There was added to the binder produced as above reinforcement in the form of 16% by weight rock wool ("Rocksil"), 1% by weight chopped glass fibre and 1% by weight wood pulp. The mixture was thorughly stirred, and was then pressed into slabs using a hydraulic press and a de-watering mould. The slabs were dried at 150° C.

Similar slabs were made from a composition as described above, but wherein 20% by weight ground mica was added at the same time as the fibrous reinforcement. The properties of the slabs were measured and the following Table shows the considerable improvement in the high temperature shrinkage properties attributable to the addition of mica.

| Property | Without Mica | With Mica |
|---|---|---|
| Bulk density | 270 kg/m³ | 285 kg/m³ |
| Compressive strength | 270 1 bf/in² | 260 1 bf/in² |
| Flexural strength | 68 1 bf/in² | 60 1 bf/in² |
| Thermal shrinkage | | |
| 950° C | 2.9 | 1.30 |
| 1000° C | 74.50 | 2.20 |

EXAMPLES 26 to 30

The following compositions can be converted into boards on the Magnani or Hatschek machine or using a simple dewatering press. By the addition of superplasticisers, e.g. sulphonated melamine-formaldehyde condensate the amounts of water needed to form a suitable slurry can be reduced. Fluidisation can be further obtained by vibration techniques. The properties given in the Table below relate to boards formed on the Magnani machine.

| | 26 | 27 | 28 | 29 | 30 |
|---|---|---|---|---|---|
| Vermiculite (95% less than 0.6mm) | 10 | — | — | — | 10 |
| Mica | — | 15 | 15 | 15 | 15 |
| Cellulose | 3 | 3 | 3 | 3 | 3 |
| Portland cement | 84 | 79 | 78.5 | 72 | 72 |
| Alkali resistant glass fibre (e.g. "Cemfil") | 3 | 3 | — | — | — |
| Steel fibre (e.g. "Duoform") | — | — | 3.5 | — | — |
| Mineral fibre (e.g. "Rocksil") | — | — | — | 10 | — |
| Density kg/m³ | 1100 | 1450 | 1500 | 1250 | 1250 |
| Modulus of rupture N/mm² | 9.5 | 19.5 | 14.5 | 13.5 | 9.5 |
| Dilatometer shrinkage at 900° C | 2.95 | 2.0 | 2.0 | 2.0 | 1.75 |

I claim:

1. A shaped article having low shrinkage characteristics when subjected to high temperatures in the order of at least 900° C, which comprises:
    a binder which has been caused to set by the action thereon of H₂O and reinforcing fibers, said binder being present in amount of 50-99% by weight of binder and reinforcing fibers, and said reinforcing fibers including organic fibers and excluding asbestos fibers; and
    a component, selected from the group consisting of mica and a mixture of mica and vermiculite, in amount of not more than 60% by weight of binder plus reinforcing fibers and component and sufficient to restrict the linear shrinkage of the article when the article is subjected to a temperature at least in the order of 900° C to a value which is significantly less than the linear shrinkage of the article in the absence of said component.

2. A shaped article as defined in claim 1 wherein said component is present in an amount of at least 10% by weight.

3. A shaped article as defined in claim 1 wherein said water-settable binder is calcium silicate hydrate.

4. A building board which may be used to provide a fire resistant structure, comprising:
    a binder which has been caused to set by the action thereon of H₂O and reinforcing fibers, said binder being present in amount of 50-99% by weight of binder and reinforcing fibers, and said reinforcing fibers including organic fibers and excluding asbestos fibers; and
    a particulate component selected from the group consisting of mica, vermiculite and mixtures thereof, said component having a particle size such that at least 95% by weight thereof is of particle size less than 0.6 mm, and said component being present in an amount not more than 60% by weight and sufficient to restrict the linear shrinkage to the article when subjected to a temperature of at least 900° C to a value which is significantly less than the linear shrinkage of the article in the absence of said component.

5. A building board as defined in claim 4 wherein said component is present in amount sufficient to restrict the linear shrinkage of the article to not more than about 3.5%.

6. A building board as defined in claim 4 wherein said component is present in amount of at least 10% by weight of binder plus said reinforcing fibers and said component.

7. A building board as defined in claim 6 including filler in amount of not more than 50% by weight of the building board.

8. A composition as claimed in claim 1 wherein said organic fibres are cellulose fibres.

9. A composition as claimed in claim 1 wherein the mica is muscovite, biotite or phlogopite.

10. A composition as claimed in claim 8 wherein the cellulose fibres are present in an amount of 2 to 15% by weight of the solids content of the composition.

11. A composition as claimed in claim 1 wherein said component has a particle size less than 2mm.

12. A composition as claimed in claim 1 which additionally contains inorganic fibrous reinforcing materials.

13. A composition as claimed in claim 12 wherein said additional fibrous materials includes fibres of glass, slag wook, rock wool, zirconium oxide, alumina, silica-alumina, aluminium silicate or of metal.

14. A composition as claimed in claim 12 wherein the inorganic fibrous reinforcing material constitutes from 0.5 to 95% by weight of the fibrous material in the composition.

15. A composition as claimed in claim 1 containing additionally a solid filler.

16. A composition as claimed in claim 15 wherein the filler is perlite.

17. A building board according to claim 4 consisting essentially of, by weight, 12 parts cellulose fibres, 31.8 parts lime, 29.2 parts quartz, 12 parts mica and 15 parts Portland cement.

18. A building board according to claim 4 consisting essentially of, by weight, 6 parts cellulose fibres, 6 parts glass fibres, 37.7 parts lime, 15.8 parts quartz, 21.5 parts diatomite and 13.0 parts vermiculite.

19. A building board according to claim 4 consisting essentially of, by weight, 10 parts cellulose fibres, 50 parts vermiculite, 21 parts lime and 19 parts quartz.

20. A building board according to claim 4 consisting essentially of, by weight, 12.0 parts cellulose, 31.8 parts lime, 29.2 parts quartz, 12.0 parts vermiculite and 15.0 parts Portland cement.

21. A building board according to claim 4 consisting essentially of, by weight, 10 parts cellulose, 42 parts lime, 21 parts quartz, 12 parts vermiculite and 15 parts Portland cement.

22. A building board according to claim 4 consisting essentially of, by weight, 12.5 parts cellulose, 35 parts lime, 32.5 parts silica and 20 parts vermiculite.

23. A building board according to claim 4 consisting essentially of, by weight, 12.5 parts cellulose, 25 parts lime, 22.5 parts silica and 40 parts vermiculite.

24. A building board according to claim 4 consisting essentially of, by weight, 10 parts cellulose, 2.5 parts glass fibre, 35 parts lime, 32.5 parts silica and 20 parts mica.

25. A building board according to claim 4 consisting essentially of, by weight, 10 parts cellulose, 2.5 parts glass fibre, 25 parts lime, 22.5 parts silica and 40 parts mica.

26. A building board according to claim 4 consisting essentially of, by weight, 7.5 parts cellulose, 37.5 parts lime, 35 parts silica and 20 parts mica.

27. A building board according to claim 4 consisting essentially of, by weight, 3 parts cellulose, 3 parts glass fibre, 32 parts lime, 32 parts silica, 15 parts mica and 15 parts vermiculite.

28. A building board according to claim 4 consisting essentially of, by weight, 3 parts cellulose, 10 parts rock wool fibre, 28.5 parts lime, 28.5 parts silica, 15 parts mica and 15 parts vermiculite.

29. A building board according to claim 4 consisting essentially of, by weight, 12.5 parts cellulose, 67.5 parts Portland cement and 20 parts vermiculite.

30. A building board according to claim 4 consisting essentially of, by weight, 12.5 parts cellulose, 47.5 parts Portland cement and 40 parts vermiculite.

31. A building board according to claim 4 consisting essentially of, by weight, 25.0 parts vermiculite, 7 parts glass fibre, 2.5 parts cellulose fibre, 20 parts diatomite, 10 parts silica and 35.5 parts lime.

32. A building board according to claim 4 consisting essentially of, by weight, 15 parts vermiculite, 10 parts mica, 3.0 parts cellulose fibre, 36 parts silica and 36 parts lime.

33. A building board according to claim 4 consisting essentially of, by weight, 25.0 parts vermiculite, 7 parts mica, 2.5 parts cellulose fibre, 20 parts diatomite, 10 parts silica and 35.5 parts lime.

34. A building board according to claim 1 consisting essentially of, by weight, 10 parts vermiculite, 3 parts cellulose, 84 parts Portland cement and 3 parts glass fibre.

35. A building board according to claim 4 consisting essentially of, by weight, 15 parts mica, 3 parts cellulose, 79 parts Portland cement, and 3 parts glass fibre.

36. A building board according to claim 4 consisting essentially of, by weight, 15 parts mica, 3 parts cellulose, 78.5 parts Portland cement and 3.5 parts parts steel fibre.

37. A building board according to claim 4 consisting essentially of, by weight, 15 parts mica, 3 parts cellulose, 72 parts Portland cement, and 10 parts mineral fibre.

38. A building board according to claim 4 consisting essentially of, by weight, 10 parts vermiculite, 15 parts mica, 3 parts cellulose, and 72 parts Portland cement.

* * * * *